US008575939B2

(12) United States Patent
Janousek et al.

(10) Patent No.: US 8,575,939 B2
(45) Date of Patent: Nov. 5, 2013

(54) APPARATUSES AND METHODS FOR DETERMINING POTENTIAL ENERGY STORED IN AN ELECTROCHEMICAL CELL

(76) Inventors: Paul Janousek, Simpsonville, OH (US); Alfredo Yanes, Fountain Inn, SC (US)

( * ) Notice: Subject to any disclaimer, the term of this patent is extended or adjusted under 35 U.S.C. 154(b) by 359 days.

(21) Appl. No.: 12/985,380

(22) Filed: Jan. 6, 2011

(65) Prior Publication Data
US 2011/0163752 A1    Jul. 7, 2011

Related U.S. Application Data (60) Provisional application No. 61/293,016, filed on Jan. 7, 2010.

(51) Int. Cl.
*H01M 10/46* (2006.01)

(52) U.S. Cl.
USPC .......................................................... 324/426

(58) Field of Classification Search
USPC .................. 320/107, 112, 132, 149, DIG. 21; 324/426, 427, 430; 340/636.1, 636.12, 340/636.14
See application file for complete search history.

(56) References Cited

U.S. PATENT DOCUMENTS

| | | |
|---|---|---|
| 5,156,931 A | 10/1992 | Burroughs |
| 5,231,356 A | 7/1993 | Parker |
| 5,312,712 A | 5/1994 | Will et al. |
| 5,358,804 A | 10/1994 | Will et al. |
| 5,396,177 A | 3/1995 | Kuo et al. |
| 5,525,439 A | 6/1996 | Huhndorff et al. |
| 5,578,390 A | 11/1996 | Hughen |
| 5,614,807 A | 3/1997 | Duley |
| 5,747,192 A | 5/1998 | Hughen et al. |
| 5,789,100 A | 8/1998 | Burroughs et al. |
| 5,849,046 A | 12/1998 | Bailey |
| 5,869,952 A | 2/1999 | Fisher et al. |
| 5,935,730 A | 8/1999 | Will et al. |
| 5,962,158 A | 10/1999 | Yoppolo et al. |
| 6,054,234 A | 4/2000 | Weiss et al. |
| 6,127,024 A | 10/2000 | Weiss et al. |
| 6,156,450 A | 12/2000 | Bailey |

(Continued)

FOREIGN PATENT DOCUMENTS

| | | |
|---|---|---|
| EP | 495636 | 7/1992 |
| EP | 523901 | 1/1993 |

(Continued)

OTHER PUBLICATIONS

Creative Materials, "102-32, Flexible, High Temperature, Electrically Conductive Adhesive," Revision Date: Oct. 17, 2007, 1 page.

(Continued)

*Primary Examiner* — Edward Tso (57) ABSTRACT

A battery includes a first terminal, a second terminal, an outer layer, and a power indicator apparatus. The power indicator apparatus comprises an electrical conductor and a mechanical switch. The electrical conductor is configured to be in continuous electrical communication with the first terminal. The mechanical switch is configured to be actuated by an application of pressure at a single location, and upon actuation, to place the electrical conductor in electrical communication with the second terminal such that the power indication apparatus can facilitate a reading of a potential energy stored in the battery. Methods of determining a potential energy stored in the battery are also provided herein.

13 Claims, 8 Drawing Sheets

(56) References Cited

U.S. PATENT DOCUMENTS

| | | |
|---|---|---|
| 6,232,782 B1 | 5/2001 | Kacprowicz et al. |
| 6,483,275 B1 | 11/2002 | Nebrigic et al. |
| RE40,506 E | 9/2008 | Burroughs et al. |
| 2004/0157027 A1 | 8/2004 | Doomernik |
| 2010/0210745 A1* | 8/2010 | McDaniel et al. ............... 521/55 |
| 2013/0022847 A1* | 1/2013 | Janousek ........................ 429/90 |

FOREIGN PATENT DOCUMENTS

| | | |
|---|---|---|
| EP | 805978 | 10/2006 |
| EP | 879484 | 8/2008 |
| JP | 11125664 | 5/1999 |
| JP | 2002107431 | 4/2002 |

OTHER PUBLICATIONS

Creative Materials, "122-12, Adhesive Conductive Thermoplastic Adhesive," Revision Date: Aug. 23, 2001, 2 pages.

International Search Report and Written Opinion dated Jul. 7, 2011 for International Application No. PCT/US2011/020291 filed Jan. 6, 2011.

* cited by examiner

APPARATUSES AND METHODS FOR DETERMINING POTENTIAL ENERGY STORED IN AN ELECTROCHEMICAL CELL

CROSS-REFERENCE TO RELATED APPLICATION

The present application claims the benefit of U.S. Provisional Application No. 61/293,016 filed Jan. 7, 2010, which is incorporated herein by reference in its entirety.

TECHNICAL FIELD OF THE INVENTION

This field of this invention relates generally to determining the potential energy stored in an electrochemical cell and, more particularly, to determining the amount of electrical power stored in a battery.

BACKGROUND OF THE INVENTION

Electrochemical cells such as batteries are common sources of electrical power for many consumer, commercial, and industrial applications. Batteries are often purchased and stored for periods of time before being used. In addition, batteries may be periodically used in a device which may slowly drain energy from the electrochemical cell. During these periods of storage or low level usage, the potential energy stored in a battery dissipates. Therefore, a battery can have a finite usable life. Apparatus and methods can be utilized to allow for the periodic determination or estimation of the amount or percentage of potential energy remaining in a battery. Such a determination can assist a user of batteries in selecting a specific battery to use or in deciding when to replace a stored supply of batteries or remove a battery from a device in which it has previously been installed.

However, an issue in the market place is that apparatus and methods currently utilized to determine the potential energy in a battery, is not consumer friendly. Currently, the marketplace is lacking a display package that is interactive, allowing consumer to check a battery's potential energy without having to actually purchase the battery. Such an apparatus would efficiently allow consumers to pick and chose a product, and would allow both retailers and consumers to weed out those products that fail. A more efficient apparatus is noticeably absent from today's market.

What is needed therefore is a reliable manner in which a consumer can determine the available battery life of a device.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In accordance with one embodiment, a battery which includes a first terminal, a second terminal, an outer layer, and a power indicator apparatus is provided. The power indicator apparatus includes an electrical conductor and a mechanical switch. The electrical conductor is configured to be in continuous electrical communication with the first terminal. The mechanical switch is configured to be actuated by an application of pressure at a single location, and upon actuation, to place the electrical conductor in electrical communication with the second terminal such that the power indication apparatus can facilitate a reading of a potential energy stored in the battery.

In a still further embodiment of the presently described invention, an electrochemical cell is provided and includes an outer shell that has a casing, a positive terminal sealed by an end cap and a negative terminal sealed by an end cap. An outer film layer covers the outer shell and a power indicator apparatus which is activated at a single site to determine potential energy that is stored in the electrochemical cell. The power indicator including an electrical conductor and a mechanical switch.

In accordance with another embodiment, a method for determining a potential energy stored in a battery includes placing an electrical conductor in continuous electrical communication with a first terminal of the battery. The method further includes actuating a mechanical switch to place the electrical conductor in electrical communication with a second terminal of the battery. The method further includes reading a potential energy stored in the battery based on an electrical current passing through the conductor.

In a still further embodiment, a method for indicating potential energy stored in an electrochemical cell is presented and includes providing an electrochemical cell that has an outer shell with a casing, a positive end sealed by an end cap and a negative end sealed by an end cap. An outer film layer covers the outer shell. A power indicator apparatus is in contact with the negative end and has silver traces wherein the power indicator apparatus includes an electrical conductor and a mechanical switch. Next, the power indicator apparatus is pressed and the casing is engaged to create an electrical circuit through the electrical conductor. Finally, a current flows through the electrical conductor such that the magnitude of the current through the electrical conductor is indicative of the amount of potential energy in the electrochemical cell.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to FIGS. 1-11. Unless otherwise specified, like numbers in FIGS. 1-11 indicate references to the same, similar, or corresponding elements throughout FIGS. 1-11. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods for determining a potential energy stored in an electrochemical cell are hereinafter disclosed and described in detail with reference made to FIGS. 1-11.

Figures 1, 2:
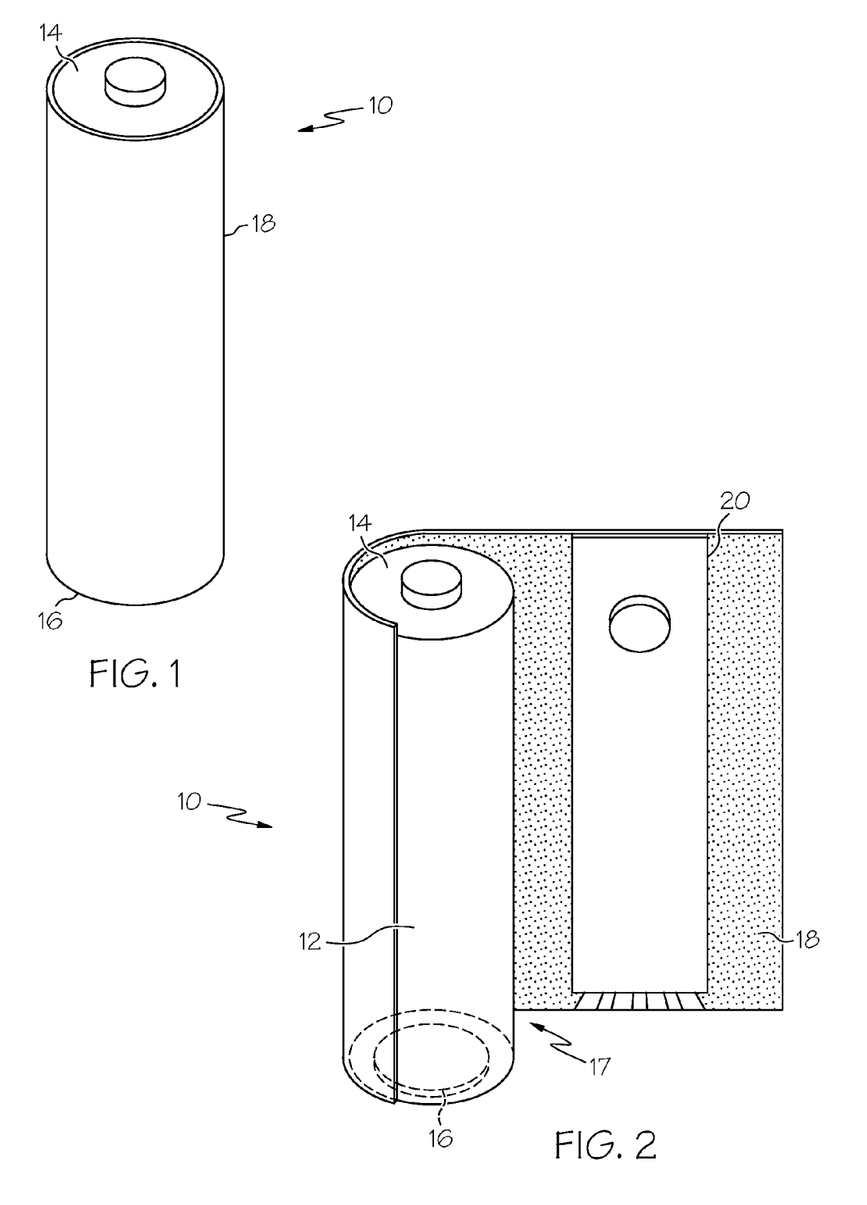
FIG. 1 is a schematic view depicting a battery in accordance with one embodiment.
FIG. 2 is a schematic view depicting the battery of FIG. 1 having an outer layer partially removed to reveal a power indicator apparatus.

A common source of portable electrical energy that uses one or more electrochemical cells is a dry cell battery. Dry cell batteries can be manufactured and sold in a variety of sizes, configurations, and voltage outputs. For example, common types of consumer batteries are marketed and known as "AA-type," "AAA-type," "C-type," "D-type," "9-volt" and so on. As illustrated in FIGS. 1 and 2, a battery 10 can comprise a metal casing 12, often cylindrical for most common types of batteries, a first end cap 14, and a second end cap 16. The first end cap 14 can at least partially seal a first open end of the casing 12, and the second end cap 16 can at least partially seal a second and opposing open end of the casing 12. Chemicals or other active elements or components used to produce electrical power can be stored within and enclosed by the casing 12, the first end cap 14, and the second end cap 16.

The casing 12, first end cap 14, and second end cap 16 can be joined to form an outer shell 17. An outer film layer 18 can then be wrapped to at least partially cover the outer shell 17. In one example, the outer layer 18 can be arranged so that it covers the casing 12 and at least a portion of the first end cap 14 and/or a portion of the second end cap 16. The outer layer 18 can include any of a variety of suitable materials or substances. In one example, the outer layer 18 can comprise a relatively thin sheet of polyethylene terephthalate (PET). In another example, the outer layer 18 can comprise a relatively thin sheet of a PET copolymer such as PET modified by adding cyclohexane dimethanol to the polymer backbone in place of ethylene glycol to form PETG. As will be further discussed, the outer layer 18 can be a shrink wrap polymeric film. In such a configuration, heat can be applied to the polymeric film, thereby causing the film to contract or shrink to the outer shape and/or contours of the outer shell 17.

The first end cap 14 and the second end cap 16 can be arranged as polar terminals for the battery 10. The first and second end caps 14 and 16 can further be arranged to be polar opposites. That is, the first end cap 14 can be arranged to be a positive terminal for the battery 10, and the second end cap 16 can be arranged to be a negative terminal for the battery 10. Conversely, the first end cap 14 can be arranged to be the negative terminal, and the second end cap 16 can be arranged to be the positive terminal. It will be understood that the casing 12 can also be arranged to form part of a terminal as well. In one example, the first end cap 14 and the casing 12 can comprise the positive terminal and the second end cap 16 can comprise the negative terminal. In such an arrangement, when a conductive material is positioned in contact with the positive terminal (i.e., the first end cap 14 or the casing 12) and in contact with the negative terminal (i.e., the second end cap 16), a circuit is completed and an electrical current passes though the conductive material The outer layer 18 can be configured to serve a number of functions. The outer layer 18 can include graphics and/or text to serve as an informational and/or marketing label for the battery 10. For example, the outer layer 18 can include the name and logo of the battery manufacturer and/or the type and voltage of the battery 10. Additionally or alternatively, the outer layer 18 can facilitate access to an interactive display that selectively indicates the amount of potential energy remaining in the battery 10, as discussed further below. In one example, an adhesive layer can be provided to secure the outer layer 18 to the outer shell 17. In a preferred embodiment the adhesive is a pressure sensitive adhesive.

As previously discussed, the outer layer 18 can comprise a polymeric shrink wrap film that conforms to the shape and/or contours of the outer shell 17 upon the application of heat. In such an arrangement, additional layers of material or generally thin apparatuses or assemblies can be positioned between the outer layer 18 and the outer shell 17 prior to the application of heat to the outer layer 18. Upon the application of heat to the outer layer 18, the shrinking and conforming of the outer layer 18 can position and/or secure additional layers or assemblies relative to the outer shell 17. For example, as illustrated in FIG. 2, a power indicator apparatus 20 can be positioned between the outer layer 18 and the outer shell 17. When the outer layer 18 is heated and conforms to the shape of the outer shell 17, the power indicator apparatus 20 can be positioned and secured so that the power indicator apparatus 20 is provided in electrical communication with at least one of the casing 12, first end cap 14, or second end cap 16. As will be further detailed, the power indicator apparatus 20 can be arranged so that a user of the battery 10 can selectively actuate the power indication apparatus 20 to determine the amount of potential energy remaining in the battery 10. In addition, the power indicator apparatus 20 can be arranged so that a user can selectively actuate the power indicator apparatus 20 by applying pressure at a single location, such as through pressing a button or raised area on the surface on the outer layer 18.

Figure 3A:
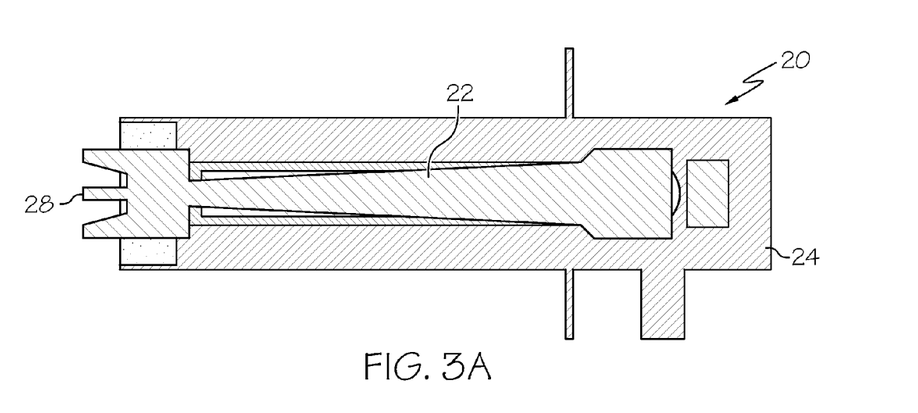
FIG. 3A is a plan view depicting the power indicator apparatus of FIG. 2.
Figure 3B:
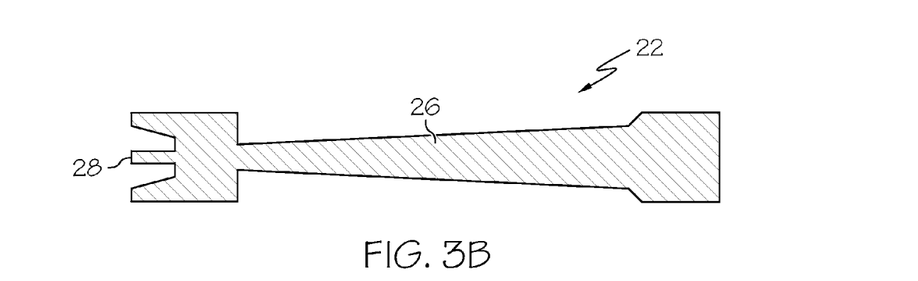
FIG. 3B is a plan view depicting an electrical conductor of the power indicator apparatus of FIG. 3A.
Figure 3C:
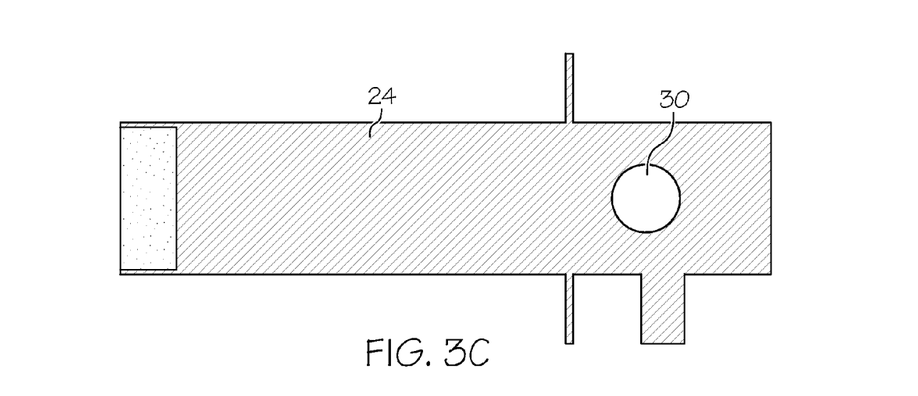
FIG. 3C is a plan view depicting a mechanical switch of the power indicator apparatus of FIG. 3A.
Figure 3D:
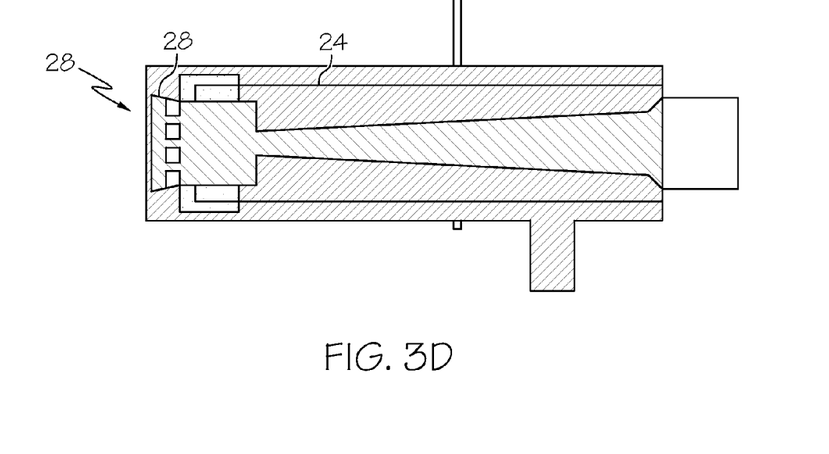
FIG. 3D is a plan view depicting a mechanical switch with power indicator apparatus coterminous with the edge of the mechanical switch.

An example of a power indicator apparatus 20 is illustrated in FIG. 3A. The power indicator apparatus 20 can include an electrical conductor 22 and a mechanical switch 24. As shown in FIG. 3B, the electrical conductor 22 can include a tapered body 26 and features 28, such as tabs or posts, extending from one end of the electrical conductor 22. The features 28 may take any number of configurations ranging from fingers as shown in FIGS. 3A and 3B, which may be straight, angled, tapered or of different lengths, that may extend beyond the edge of the mechanical switch 24 or be coterminous with the mechanical switch 24. Alternatively, the feature 28 may be a solid block or block with holes or spacers as shown in FIG. 3D.

The electrical conductor 22 can be made from any of a variety of suitable electrically conductive materials such as, for example, silver, copper, gold, and the like. The mechanical switch 24 is also illustrated in FIG. 3C. The material forming the mechanical switch 24 can have insulative properties so that when the mechanical switch 24 is positioned adjacent to the electrical conductor 22, the mechanical switch 24 can generally insulate the electrical conductor 22 from other components of the battery 10. The mechanical switch 24 can include an aperture 30 through which the electrical conductor 22 can be selectively engaged with proximate or adjacent components. As illustrated in FIG. 3A, a portion of the electrical conductor 22 can be positioned over the aperture 30. Pressure can be applied at or near the aperture 30 to temporarily deform the electrical conductor and/or the mechanical switch 24 and allow electrical communication between the electrical conductor 22 and the outer shell 17 through the aperture 30.

Figure 4:
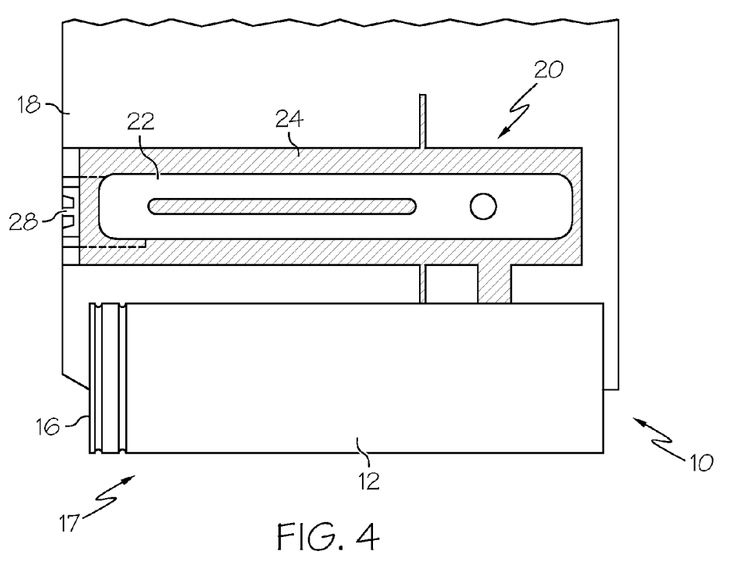
FIG. 4 is a perspective view depicting the battery of FIG. 1 being partially unassembled, with the outer layer and the power indicator apparatus positioned adjacent to an outer shell of the battery.

The power indicator apparatus 20 can be positioned proximate or adjacent to the outer shell 17. As illustrated in FIG. 4, the power indicator apparatus 20 can be positioned between the outer layer 18 and the outer shell 17 so that when the outer layer 18 is shrink-wrapped or otherwise secured to the outer shell 17, the power indicator apparatus 20 is positioned and secured proximate or adjacent to the outer shell 17. As illustrated in FIG. 3A, the features 28 of the electrical conductor 22 can extend beyond the mechanical switch 24 such that when the battery 10 is assembled, the features 28 can be in continuous contact with the second end cap 16, which can be arranged to be the negative terminal of the battery 10.

The mechanical switch 24 can be arranged to selectively insulate the remainder of the electrical conductor 22 from the casing 12 or other positive terminal of the battery 10. In addition, other insulators can be provided such as cardboard, paperboard, fibrous material, printed ink or other material which may provide suitable insulative properties. In such an arrangement, during normal use of the battery 10, no electrical current passes through the electrical conductor 22.

Figure 12:
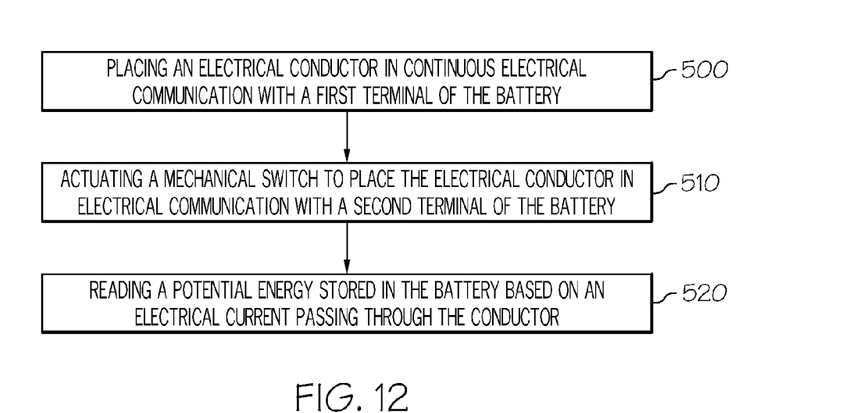
FIG. 12 is method of determining a potential energy stored in an electrochemical cell.

FIG. 12 illustrates a method of determining a potential energy stored in an electrochemical cell. First, an electrical conductor is placed in continuous electrical communication with a first terminal of the battery (500). Next, a mechanical switch is actuated in order to place the electrical conductor in electrical communication with a second terminal of the batter (510). Lastly, the potential energy stored in the battery is read based on an electrical current passing through the conductor (520).

Figure 13:
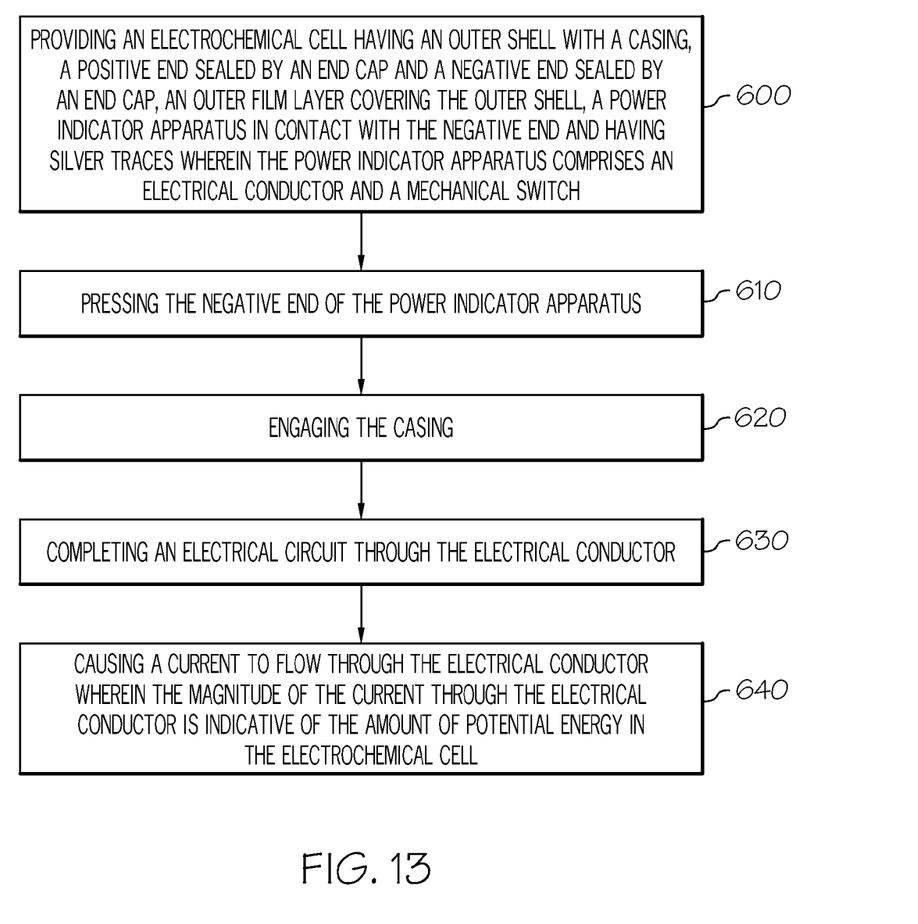
FIG. 13 is a method for indicating potential energy stored in an electrochemical cell

FIG. 13 illustrates another applicable method, when a user wants an indication of the power energy remaining in an electrochemical cell 10. An electrochemical cell having an outer shell with a casing, a positive end sealed by an end cap and a negative end sealed by an cap, an outer film layer covering the outer shell, a power indicator apparatus in contact with the negative end and having silver traces wherein the power indicator apparatus comprises an electrical conductor and a mechanical switch is provided (600). Silver traces extend beyond the area being tested and provide continual and intimate contact with the negative end of the electrochemical cell. Silver traces in one embodiment are extended in an L shape. The user can manually manipulate the mechanical switch 24 by pressing the power indicator apparatus (610) such that a portion of the electrical conductor 22 engages the casing 12 (620) though the aperture 30, wherein the casing 12 forms a portion of the positive terminal of the battery 10. The contact with the positive terminal of the battery 10 completes an electrical circuit through the electrical conductor 22 and causes an electrical current to flow through the electrical conductor 22. (630, 640). The magnitude of the electrical current through the electrical conductor 22 can be dependent upon and, therefore, indicative of, the amount of potential energy remaining or stored in the battery 10.

Electrical current flowing though the electrical conductor 22 can generate heat in the electrical conductor 22. As illustrated in FIG. 3B, the body 26 of the electrical conductor 22 can be tapered with the width of the electrical conductor 22 varying along its length. Narrow portions of the body 26 can rise to a higher temperature under a given current than broader portions of the body 26. A thermochromatic material can be positioned in contact with or proximate to the electrical conductor 22. The thermochromatic material can be arranged so that heat generated by the electrical conductor 22 can be transferred to the thermochromatic material. The thermochromatic material can respond to the transfer of heat by changing color in proportion to a temperature of the thermochromatic material. It will be understood that the tapered configuration of the electrical conductor 22, the position of the thermochromatic layer relative to the electrical conductor 22, and the positioning and configuration of the thermochromatic layer can be arranged to result in a visual indication to a user that corresponds with the amount of potential energy remaining in the battery 10.

Figure 5:
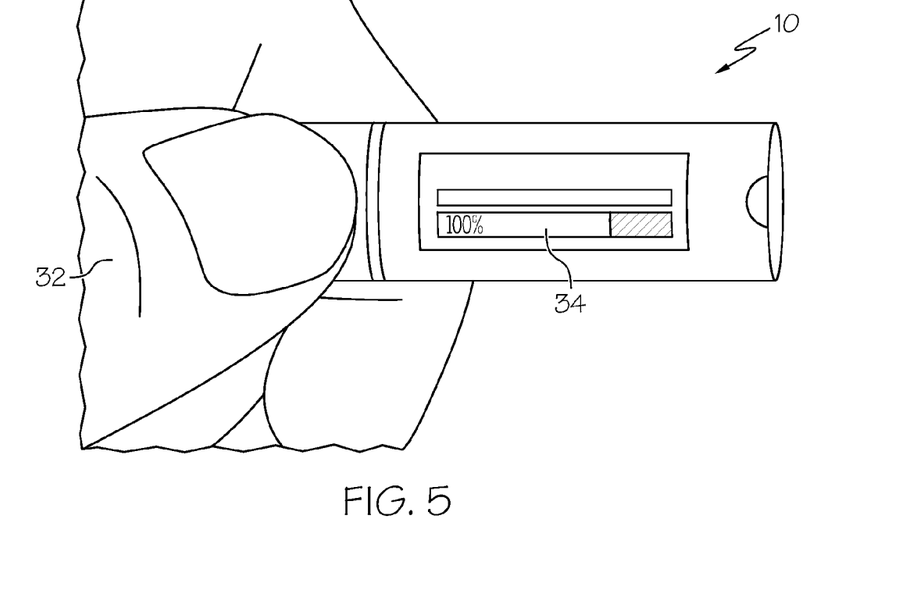
FIG. 5 is a perspective view depicting an operator initiating a reading of a potential energy stored in the battery of FIG. 1.

FIG. 5 illustrates a user initiating a reading of potential energy remaining in the battery 10. The user initiates the reading by placing pressure at a single point, such as a button or designated area, on the mechanical switch 24. The user can apply pressure using a single digit, in this case the user's thumb 32. Pressure is applied at a location on the outer layer 18 that corresponds with the location of the aperture 30 of the mechanical switch 24 that is positioned under the outer layer 18 and proximate to the casing 12. The location along the outer layer 18 that initiates a reading can be marked for the user by a graphic on the outer layer 18 illustrating where pressure should be applied. The power indicator apparatus 20 can be arranged so that when pressure is placed adjacent to the aperture 30 of the mechanical switch 24, the electrical conductor 22 and/or the mechanical switch 24 deflects and the electrical conductor 22 physically engages the casing 12 through the aperture 30. Thus, a circuit is completed through the electrical conductor 22. Such an arrangement allows for the user to selectively actuate the power indicator apparatus 20 to initiate a reading. As illustrated in FIG. 5, a dynamic graphic 34 on the outer layer 18 can display a reading that estimates the amount of potential energy stored in the battery 10.

Although the electrical conductor 22 is described as generally remaining in contact with the negative terminal of the battery 10 and selectively engaging with the positive terminal of the battery 10, it will be understood that the electrical conductor 22 can alternatively be arranged so that the electrical conductor 22 generally remains in contact with the positive terminal and is selectively engaged with the negative terminal.

Figure 6:
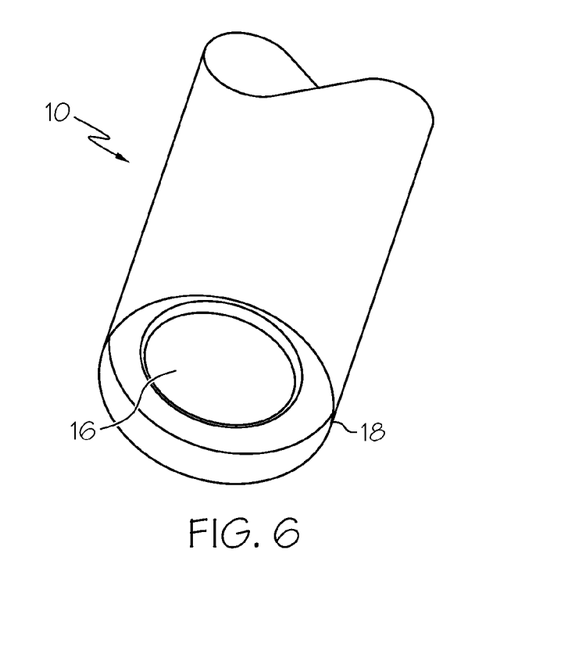
FIG. 6 is a perspective view depicting the battery of FIG. 1 having the outer layer only partially assembled.

The power indicator apparatus 20 can be attached to the outer layer 18, and the outer layer 18 can be attached to the outer shell 17. The position of the power indicator apparatus 20 relative to the outer shell 17 can therefore be determined by the manner in which the outer layer 18 is shrink-wrapped or otherwise secured to the outer shell 17. When the outer layer 18 comprises a polymeric shrink wrap film that shrinks to fit around the outer shell 17 upon heating, the position of the power indicator apparatus 20 to the pre-shrunk outer layer 18 can determine the position of the power indicator apparatus 20 relative to the outer shell 17 after the outer layer 18 is shrunk. In particular, the position of the power indicator apparatus 20 can determine if a portion of the electrical conductor 22 will generally remain in continuous contact with the negative terminal of the battery 10 upon shrinking of the outer layer 18. As seen in FIG. 6, prior to the shrinking of the outer layer 18, a portion of the outer layer 18 extends beyond the second end cap 16. As the outer layer 18 shrinks, the portion of the outer layer 18 extending beyond the second end cap 16 of the battery 10 can wrap around to cover a portion of the second end cap 16. By careful positioning of the electrical conductor 22 relative to the outer layer 18, the position of the electrical conductor 22 relative to the second end cap 16 upon shrink-wrapping of the outer layer 18 can be controlled.

A number of variables can be arranged to control the final positioning of the power indicator apparatus 20 relative to the outer shell 17. For example, a portion of the electrical conductor 22 (i.e., the features 28) can generally extend beyond the mechanical switch 24 as illustrated in FIG. 3A, for example. The arrangement of the extension of the electrical conductor 22 beyond the mechanical switch 24 can determine how large a portion of the electrical conductor 22 is in contact with the second end cap 16 upon shrink-wrapping of the outer layer 18. In another example, the portion or features 28 of the electrical conductor 22 that do extend beyond the mechanical switch 24 can be arranged in various geometries.

Figure 7:
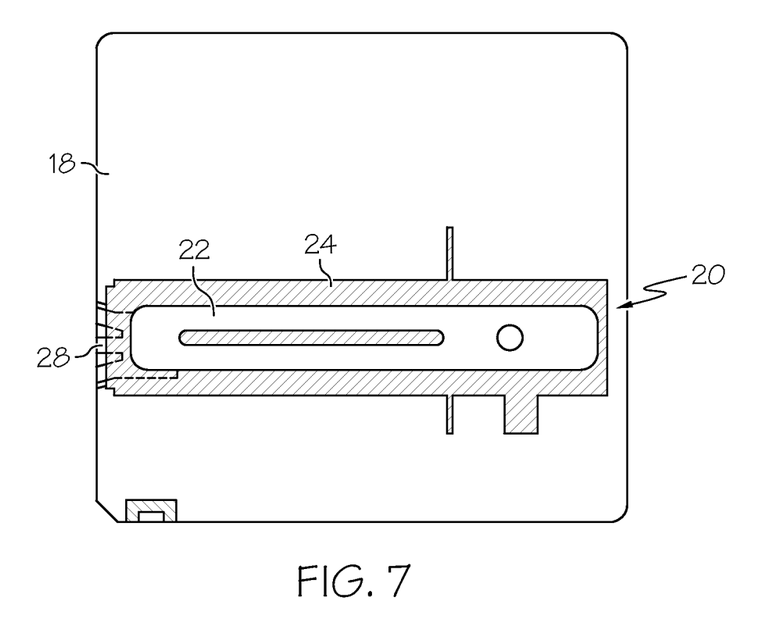
FIG. 7 is a plan view depicting the power indicator apparatus positioned on the outer layer of the battery of FIG. 1.

An example of the power indicator apparatus 20 positioned on the outer layer 18 prior to shrink-wrapping on the battery is illustrated in FIG. 7. The end of the electrical conductor 22 is positioned to align with the edge of the outer layer 18. The electrical conductor 22 includes three features 28 or tabs that extend beyond the mechanical switch 24. As the outer layer 18 shrinks, a portion of the outer layer 18 wraps around the second end cap 16 and conforms to the shape of the second end cap 16. The features or tabs 28 can also be wrapped around the second end cap 16 by the shrinking of the outer layer 18, and the features or tabs 28 can be placed in contact with the second end cap 16, which can be arranged as the negative terminal of the battery 10. This contact can be generally maintained continuously due to the conforming of the outer layer 18 to the contours of the outer shell 17. A portion of the mechanical switch 24 can also wrap around the second end cap 16 to cover at least a portion of the second end cap 16. Such an arrangement can guard against a portion of the electrical conductor 22 coming into contact with the casing 12, which can be arranged to be part of the positive terminal.

Features 28 of the electrical conductor 22 can be configured in a variety of suitable arrangements to facilitate electrical communication for a variety of different batteries. Batteries can have different geometries, different positive and/or negative terminals, and different material compositions. The electrical conductor 22, the features 28 of the electrical conductor 22, the mechanical switch 24, and the outer layer 18 can be arranged so as to form a generally continuous electrical contact with the positive or negative terminal of the battery 10 upon the shrink-wrapping of the outer layer 18 to the outer shell 17.

In an example, prior to the shrink-wrapping of the outer layer 18 to the outer shell 17, a conductive adhesive can be applied to the exposed portion of the electrical conductor 22 or to the second end cap 16. Upon the shrink-wrapping of the outer layer 18, the conductive adhesive can bond the electrical conductor 22 to the second end cap 16. Such bonding can further maintain continuous contact between the second end cap 16, which can be configured to be one of the terminals of the battery 10, and the electrical conductor 22.

The power indicator apparatus 20 has heretofore been described and illustrated to include multiple separate components. It will be understood that two or more of the components of the power indicator apparatus 20 can be manufactured together, or that any component can be an assembly of multiple subcomponents. In one example, all the components of the power indicator apparatus 20 can be printed onto a substrate. In another example, the electrical conductor 22 can be printed onto the mechanical switch 24 or to another insulative component. In addition, adhesives can be used to secure the power indicator apparatus 20 or individual components thereof to the outer layer 18 or to the outer shell 17 of the battery 10.

In another embodiment, the power indicator apparatus 20 as disclosed herein can be used to temporarily power an electrical device (not shown) upon the actuation of the mechanical switch 24. When the mechanical switch 24 is actuated to close the circuit and cause electrical current to flow through the electrical conductor 22, the current can be directed to the electrical device. For example, packaging for a consumer item can be arranged so that a consumer can apply pressure to a specified location on the packaging to actuate the mechanical switch 24. Instead of generating only heat with the resulting current, the current can be directed to a lighting source that illuminates a portion of the packaging that identifies the company selling the product, an important fact or product advantage, a price of the product, and the like.

Although this disclosure generally describes the mechanical switch 24 as having insulative properties so as to function as an insulator for the electrical conductor 22, it will be understood that a separate insulating material can also be provided to insulate the electrical conductor 22 from undesired contact with the positive and/or negative terminals or other components of the battery 10. Exemplary insulating materials may include cardboard, paperboard or other cellulosic or fibrous materials, glass beads, printed ink, non-conductive films, putty, clay and such other suitable insulating materials.

Figure 8:
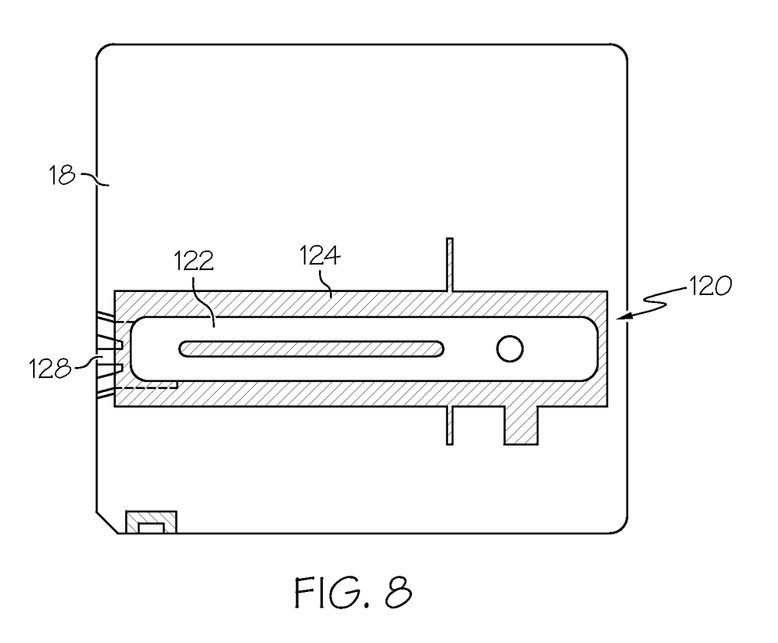
FIG. 8 is a plan view depicting a power indicator apparatus positioned on an outer layer for a battery, in accordance with a second embodiment.

Another embodiment of a power indicator apparatus 120 is illustrated in FIG. 8. The power indicator apparatus 120 can be positioned on the outer layer 18 prior to shrink-wrapping of the outer layer 18 to the outer shell 17. The arrangement illustrated in FIG. 8 is similar to the arrangement illustrated in FIG. 7 in that an end of an electrical conductor 122 of the power indicator apparatus 120 is positioned to align with an edge of the outer layer 18, and the end of the electrical conductor 122 includes three features 128 or tabs. However, a mechanical switch 124 of the power indicator apparatus 120 is arranged so that a larger portion of the electrical conductor 122 is exposed beyond the mechanical switch 124. Such an arrangement can provide for a larger contact area between the electrical conductor 122 and a second end cap of a battery (such as the second end cap 16 of battery 10) and/or can account for greater variations in the shrinkage of the outer layer 18.

Figure 9:
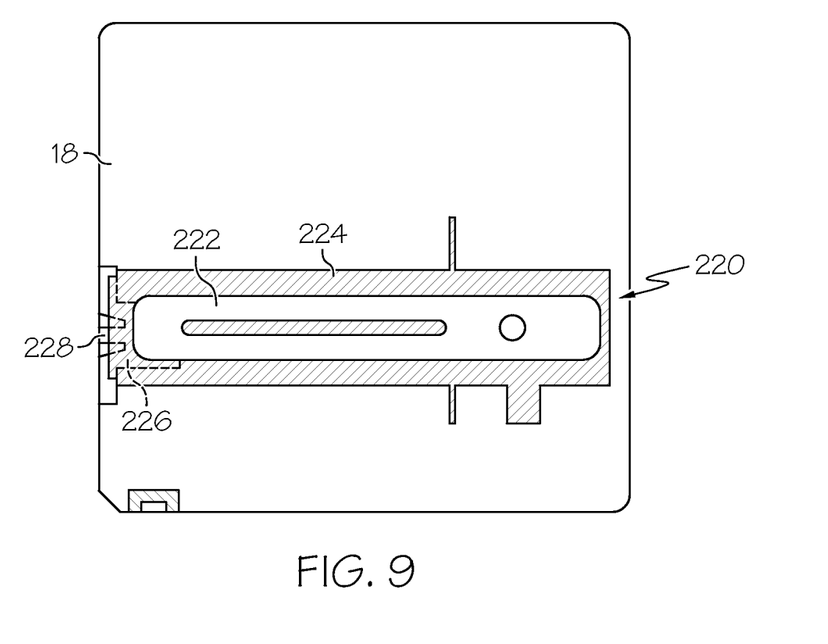
FIG. 9 is a plan view depicting a power indicator apparatus positioned on an outer layer for a battery, in accordance with a third embodiment.

Yet another embodiment of a power indicator apparatus 220 is illustrated in FIG. 9. The power indicator apparatus 220 can be positioned on the outer layer 18 prior to shrink-wrapping of the outer layer 18 to the outer shell 17. An end of an electrical conductor 222 of the power indicator apparatus 220 is shown to be positioned to align with an edge of the outer layer 18. The end of the electrical conductor 222 is shown to include a feature 228 or T-shaped post. The feature 228 is shown to be generally wider than a body 226 of the electrical conductor 222. A mechanical switch 224 of the power indicator apparatus 220 can provide for a portion of the feature 228 to be exposed beyond the mechanical switch 224. The T-shape of the feature 228 can provide for a substantial surface area by which to achieve effective electrical communication of the electrical conductor 222 with a second end cap of a battery (such as the second end cap 16 of battery 10) upon the shrink-wrapping of the outer layer 18 to the outer shell 17.

Figure 10:
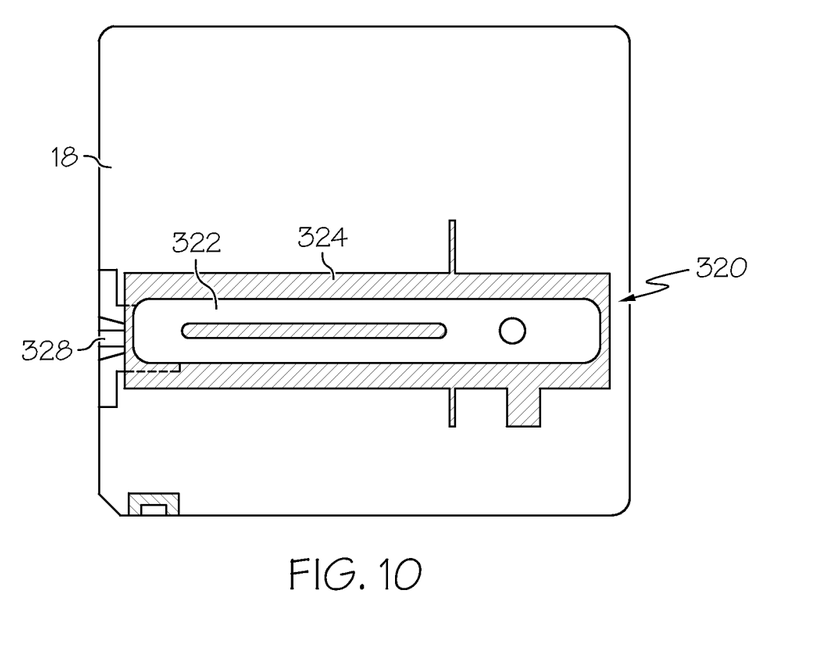
FIG. 10 is a plan view depicting a power indicator apparatus positioned on an outer layer for a battery, in accordance with a fourth embodiment.

Yet another embodiment of a power indicator apparatus 320 is illustrated in FIG. 10. The power indicator 320 is shown to be positioned on the outer layer 18 prior to shrink-wrapping of the outer layer 18 to the outer shell 17. The arrangement illustrated in FIG. 10 is similar to the arrangement illustrated in FIG. 9 in that an end of an electrical conductor 322 of the power indicator apparatus 320 is positioned to align with an edge of the outer layer 18, and the end of the electrical conductor 322 includes a T-shaped feature 328. However, a mechanical switch 324 of the power indicator apparatus 320 provides for a larger portion of the feature 328 and a portion of the electrical conductor 322 to be exposed beyond the mechanical switch 324. Such an arrangement can provide for a larger contact area between the electrical conductor 322 and a second end cap of a battery (such as the second end cap 16 of battery 10) and/or can account for greater variations in the shrinkage of the outer layer 18.

Figure 11:
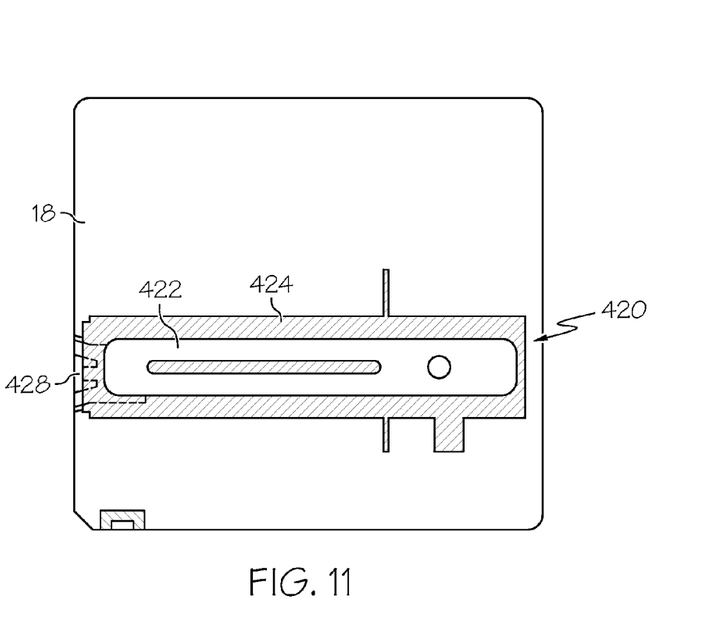
FIG. 11 is a plan view depicting a power indicator apparatus positioned on an outer layer for a battery, in accordance with a fifth embodiment.

Yet another embodiment of a power indicator apparatus 420 is illustrated in FIG. 11. The power indicator apparatus 420 is shown to be positioned on the outer layer 18 prior to shrink-wrapping of the outer layer 18 to the outer shell 17. An end of the electrical conductor 422 of the power indicator apparatus 420 is shown to be positioned to align with an edge of the outer layer 18, and to include an extended feature 428. A mechanical switch 424 of the power indicator apparatus 420 can provide for a portion of the electrical conductor 422 to be exposed beyond the mechanical switch 424. The extended feature 428 can be arranged in any of a variety of suitable lengths to provide for effective electrical communication of the electrical conductor 422 with a second end cap of a battery (such as the second end cap 16 of battery 10).

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. An apparatus for determining a potential energy stored in an electrochemical cell comprising:
   a first terminal, a second terminal, an outer layer, and a power indicator apparatus, wherein the outer layer is a shrink wrap polymeric film;
   the power indicator apparatus includes an electrical conductor and a mechanical switch;
   the electrical conductor is configured to be in continuous electrical communication with the first terminal;
   the mechanical switch is configured to be actuated by an application of pressure at a single location, and upon actuation, to place the electrical conductor in electrical communication with the second terminal such that the power indication apparatus can facilitate a reading of a potential energy stored in the battery.

2. The apparatus of claim 1, wherein the outer layer includes PET.

3. The apparatus of claim 1, wherein the electrical conductor included a tapered body and features.

4. The apparatus of claim 3, wherein the features are in continuous contact with the second terminal.

5. The apparatus of claim 1, wherein the electrical conductor is made from silver, copper, or gold.

6. The apparatus of claim 1, wherein a material forming the mechanical switch has insulative properties.

7. The apparatus of claim 1, wherein the apparatus further comprises an outer shell.

8. The apparatus of claim 6, wherein the power indicator apparatus is adjacent to the outer shell.

9. A battery comprising:
   a first terminal, a second terminal, an outer layer, and a power indicator apparatus;
   the power indicator apparatus includes an electrical conductor and a mechanical switch wherein the outer layer is a shrink wrap polymeric film;
   the electrical conductor is configured to be in continuous electrical communication with the first terminal; and
   the mechanical switch is configured to be actuated by an application of pressure at a single location, and upon actuation, to place the electrical conductor in electrical communication with the second terminal such that the power indication apparatus can facilitate a reading of a potential energy stored in the battery.

10. The battery of claim 9, wherein the power indicator apparatus is attached to the outer layer.

11. The battery of claim 9, wherein a position of the power indicator relative to an outer shell is determined by a manner in which the outer layer is shrink-wrapped.

12. The battery of claim 9, wherein the electrical conductor comprises features.

13. The battery of claim 11, wherein the electrical conductor, features, mechanical switch and the outer layer form continuous electrical contact with a terminal.

* * * * *